Patented Oct. 16, 1945

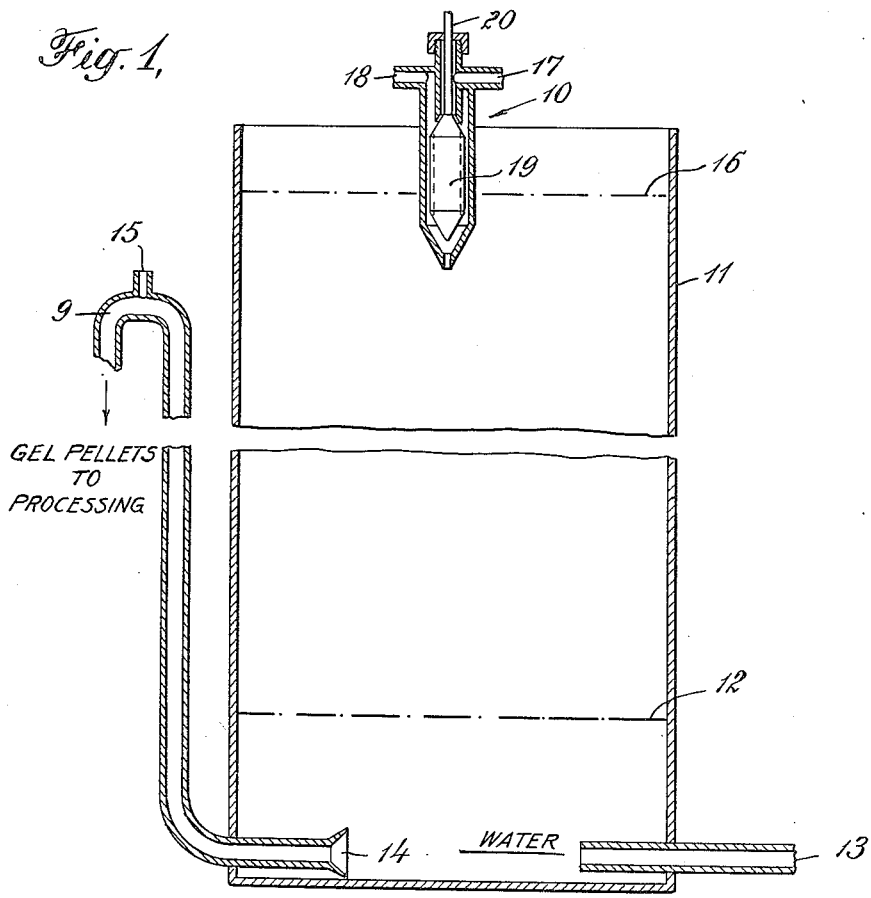
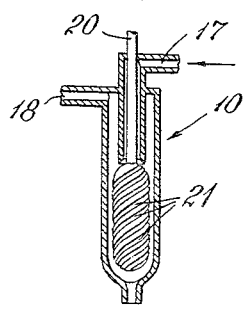
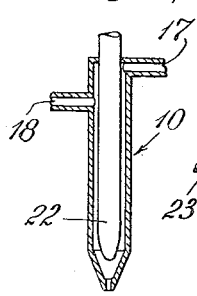
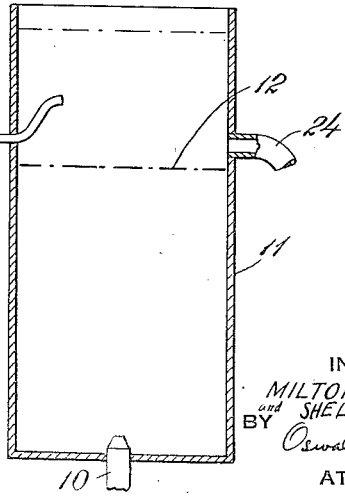

2,386,810

UNITED STATES PATENT OFFICE 2,386,810

GELS COMPRISING SILICA

Milton M. Marisic and Sheldon Dray, Woodbury, N. J., assignors to Socony-Vacuum Oil Company, Incorporated, a corporation of New York Application April 8, 1943, Serial No. 482,331

14 Claims. (Cl. 252—317)

This invention is concerned with the preparation of hydrogels comprising silica and is more particularly directed to an improvement in previously known processes whereby hydrogels of greater oxide content may be prepared which can then be dried to give rigid solids.

In the preparation of synthetic porous solids comprising silica having adsorbent properties, hydrated silica or silicic acid is caused to separate from an aqueous solution. Under proper conditions, the silica will be in the form of a true gel, but under other conditions, a gelatinous precipitate of silicic acid is formed. In some cases, it is a matter of little importance whether a gel or precipitate is formed, and the precipitate has often been referred to as a "gel," despite the fact that it is not properly a gel at all. In many cases, however, it is highly desirable that a true gel be formed. For example, the process of forming spheroidal particles described in the copending application Serial No. 461,454, filed October 9, 1942, by Milton M. Marisic, it is essential that there be gelation with substantially no precipitation. The Marisic process is described in detail below in considering preferred embodiments of the present invention. Briefly, the Marisic process involves formation of gelable colloidal solution, separation of the solution into globules and gelation in the globular form. A suitable process is to project a stream of freshly prepared colloidal solution into a body of oil in which the stream breaks up into globules which gel as they fall through the oil. The gel globules are then washed and dried to give a mass of solid porous beads. It is apparent that gelation time is an important factor in such a process. Certain general relationships have been found in this connection. The time of gelation is dependent upon temperature, pH of the colloidal solution and concentration of gelable substance. The higher the temperature, the shorter the time of gelation. At fixed concentration of reactants, the gelation time increases with decrease in pH. When the temperature and pH are constant, the gelation time decreases as the reactant solutions are made more concentrated. It has been found that the preferred gels for many purposes, notably when the gel is intended as catalyst for cracking of hydrocarbons, are prepared from colloidal solutions of pH 5 to 8, and further that gels of commercial value may be prepared from colloidal solutions of pH 2.5 to about pH 10. Further, if the concentration of any given type of colloidal solution is increased above a critical value, precipitation takes place. It follows that the known facts impose a limiting value on concentration of solids in the gel. In preferred embodiments of the dried gel in the form of spheroidal bodies having smooth hard surfaces, a gelation time sufficient to permit extrusion into oil before gelation is essential and in any gelation process the concentration must be low enough to permit gel formation.

Yet, from the economic standpoint, it is desirable to prepare a gel of as great a solid concentration as possible. For example, high solid concentration reduces the load on drying equipment. High concentration gives a greater amount of active material per unit volume of hydrogel and, accordingly, increases the capacity of the gel forming units. By the methods of this invention, dried gels may be manufactured which have higher densities than other contact materials used for similar purposes as known in the arts. Increased density is itself desirable in some cases. For example, if small particles, say, 0.1 mm. are prepared for use in the so-called "fluid catalyst" process, increased density makes for efficient separation of catalyst from gases. In that process a catalyst of small sized particles is suspended in a stream of gas and, after treatment is complete, the solid is separated as in a cyclone separator. Obviously, particles of greater density tend to separate more readily from the gaseous suspending medium.

We have now found that the concentration of the hydrogel may be substantially increased by using a combination of a strong acid and a weak acid to adjust the pH of a stable aqueous alkaline solution of inorganic salts to a gelation pH. For example, silica gel is prepared according to the prior art by acidifying a water glass solution. If the acidifying agent is a combination of a weak and a strong acid, greater concentration of silica is possible without precipitation and the concentration of silica may even be increased with an increased gelation time as compared with solutions prepared by the use of strong acids only in the conventional manner. The term "strong acid" is used here in its normal sense, referring to the relatively few mineral acids which are substantially completely ionized in moderately concentrated (normal) aqueous solution. As is well known, this group includes hydrochloric, sulfuric and nitric acids. In contrast, all acids not falling within this group are known as weak acids. The weak acid seems to stabilize the highly concentrated silica sol and inhibits precipitation, so that the sol sets to a hydrogel without appreciable precipitation.

The relative quantity of weak acid required appears to be not noticeably dependent on the ionization constant of the weak acid. In general, any quantity of weak acid will have some effect, but marked improvement is not obtained with less than about one equivalent of weak acid to 36 equivalents of strong acid. The improvement is increased as the quantity of weak acid is increased up to about one equivalent of weak acid to about 18 parts of strong acid. Greater relative amounts of weak acid do not produce an effect commensurate with the quantity added and the ratio of 1 to 18 appears to be about the optimum.

The weak acid may be either an inorganic acid such as phosphoric or an organic acid such as acetic, tartaric or citric.

The invention is of particular importance in preparing gels of silica or silica-alumina wherein the alumina is supplied at least in part as an aluminate. Strong and weak acids are to be used in preparing a silica-alumina gel; best results are obtained by supplying alumina as sodium aluminate (or other soluble metal aluminate). The attainable increase in concentration of silica-alumina appears to be dependent in part on the ratio of aluminum salt (such as aluminum sulfate) to aluminate where the former is used in part. More concentrated silica-alumina hydrogels are obtained as the ratio of sodium aluminate to an aluminum salt is increased.

The weak acid may, if desired, be supplied wholly or in part as a soluble metal salt to become effective when mixed with the strong acid to prepare the colloidal gelable solution. Thus sodium acetate may be dissolved in water glass and this solution is mixed with sulfuric acid alone in order to achieve the same effect as adding water glass to a mixture of sulfuric and acetic acids.

According to a preferred embodiment of the invention, the gel is prepared in the form of spheroidal pellets.

This process of forming the pellets involves continuously contacting within an enclosed mixing chamber, such as an injector or nozzle mixer, streams of reactant solutions of such concentrations and proportions that no gelation occurs within the mixer, but only at some predetermined time after leaving the mixer, and under such conditions of flow that each stream is completely and uniformly dispersed within and throughout the other at the instant of contact. The resulting colloidal solution is ejected from the mixer through orifice or orifices of suitable size so as to form globules of the solution which are introduced into a fluid medium where the globules of the colloidal solution set to a gel before they pass out of that medium. The fluid medium may be any liquid or combination of liquids which is immiscible with water, such as, for example, petroleum naphtha, kerosene, hydrocarbon oils, etc.

There are two alternative methods of operation which are dependent upon the density of the fluid employed. When the density of the fluid is lower than that of water, the fluid is supported over a layer of water and the colloidal solution from the mixer is introduced at the top of the column of fluid; the height of the latter and the gelation time being adjusted so that gelation occurs within the fluid and before the globose particles reach the water surface. For a fluid more dense than water, the procedure is reversed; the colloidal solution is ejected into the bottom of the fluid, the globules rise up through the fluid, gel and pass into a layer of water which conducts the gel away from processing.

The shapes of the formed gel are dependent upon the rate at which the globules of the colloidal solution travel through the water-immiscible liquid; while the rate of movement of the globules depends upon the relative density and viscosity of the fluid medium employed. If the latter medium has a low viscosity and a density far removed from that of the colloidal solution, the globules of the latter solution will travel rapidly, hence, the gel pellets will assume flat or disc-like shapes. Examples of liquids in which pellets of this type may be produced are benzene, carbon tetrachloride, or petroleum naphtha. A water-immiscible fluid medium having high viscosity or a density close to that of the colloidal solution will effect slow movement of the globules of the latter solution and thus form spherically-shaped gel pellets. It is apparent from the above description that gell pellets of any shape, varying from flat-like discs to perfect spheres, may be manufactured by choice of water-immiscible fluid medium having the proper density and viscosity.

A number of variations in the methods described above may be employed which are to be considered within the scope of this invention. For example, it may be desired to mix the reactant solutions at such concentrations that gelation occurs, say, at one minute after the solution leaves the mixing chamber. This would require a rather long column of fluid medium in order that gelation takes place in the fluid, but a considerably shorter column may be used by simply increasing the temperature of the fluid medium so that the time of gelation is decreased.

Suitable apparatus for the practice of this preferred process is shown in the annexed drawing wherein:

Figure 1 is a section through a preferred form of the apparatus;

Figure 2 shows a modified type of a mixing nozzle;

Figure 3 is an illustration of a very simple mixing nozzle; and Figure 4 is a view of a modified form of apparatus according to the invention.

Referring to Figure 1, a mixing nozzle indicated generally at 10, is mounted at the top of a column of water-immiscible fluid in a tank 11. At the bottom of tank 11 is a layer of water which forms an interface 12 with the column of said fluid. Water is continuously supplied through inlet 13 and withdrawn through outlet 14. The interface at 12 is maintained by properly adjusting the height of conduit 9 in correlation with the density of the fluid medium and the rate at which water is supplied at 13. Vent 15 prevents siphoning action. The flow of water carries away the gel pellets through outlets 14 and 9 to suitable washing and treating stages. The water in which the pellets are carried away is itself a washing medium and may include any desired treating material to act as a treating stage.

The colloidal solution from which the pellets are formed is made up and admitted to the column of fluid by the mixing nozzle 10. Preferably, the apparatus will include a plurality of nozzles 10 in order to increase the capacity of the unit; but only one is shown here for purposes of simplicity. The nozzle 10 includes means for completely dispersing two solutions in each other and admitting a continuous stream of the so-formed colloidal solution below the surface 16 of the water-immiscible fluid, wherein the stream of the colloidal solution breaks up into globules. The colloidal solution or globules thereof may be dropped on the surface of the fluid but this tends to break them and impairs control over pellet size obtained by injecting the colloidal solution under the surface of the liquid. It must be borne in mind, that considerable shrinkage takes place, not only by syneresis, but also during drying and processing. Control of globule size must take into account this shrinkage.

The size of the globules is controlled by the rate at which the colloidal solution flows through the nozzle orifice and the dimensions of the latter. A simple modification in controlling the size of the globules is the introduction of a baffle just outside of the nozzle mixer and in the stream of the colloidal solution. Furthermore, sizing is a matter of relative densities and viscosities of the colloidal solution and water-immiscible liquid.

In the mixing nozzle 10, solutions to be mixed are metered accurately and then admitted through lines 17 and 18 to a chamber which has a rotor 19 rotated by shaft 20 at a speed of at least about 1700 R. P. M., from a source of power not shown. The rotor 19 is constructed from a rectangular bar of metal whose edges are rounded off in such manner that the walls of the mixing chamber serve as a guide for them. The rounded edges of the rotor are grooved; thus, efficient dispersion of both solutions in each other is maintained and gel formation is prevented in the mixing nozzle. The rotor may be fluted in any suitable manner or provided with other inequalities of surface to increase agitation in the mixing zone. Helical grooves for such purpose are shown on the rotor 21 of the modified form of mixing nozzle illustrated diagrammatically in Figure 2. The best operation of the mixing nozzle is realized when the rates of the reactant solutions are so high that the time the latter solutions spend in the mixing chamber is only a very small fraction of the gelatin time.

A further modification is the extremely simple mixer of Figure 3, wherein the rotor 22 is merely a shaft which may be fluted, grooved, etc.

Another modification that may be applied to any of the mixing nozzles illustrated in Figures 1, 2 and 3 is to provide means for injecting air into the solutions admitted to the mixing chamber or to the mixing nozzle itself. By this means, hydrogel pellets are obtained which contain numerous small bubbles of air which serve to make the processed dry gel less dense in nature and more porous.

The apparatus of Figure 4 is adapted for upward flow of the colloidal solution during gelation. In this case, the mixing nozzle 10 is positioned at the bottom of shell 11 which contains a column of water-immiscible liquid heavier than water, with water thereabove, the liquid-liquid interface being again indicated at 12. Water is admitted by a pipe 23 while water carrying gelled spheroids is withdrawn by discharge line 24.

A peculiar feature of the present gel pellets is their transparency; they having the appearance of clear glass beads, in many cases. This appearance is retained only when silica is predominant, the transparency being lost as content of other oxides is increased. For example, 12.5% alumina is about the upper limit for glassy appearance of silica-alumina gels, when prepared from colloidal solutions having a pH below 8.

The present pellets are extremely hard; due to this property and their smooth surfaces, they are capable of resisting losses by attrition and shock in handling for a period many times longer than the molded pellets used heretofore.

Example I

A water glass solution was prepared by diluting 27.40 pounds of "N" brand sodium silicate (28.7% $SiO_2$, 8.9% $Na_2O$) with 17.68 pounds of water. This solution contained 0.212 gram $SiO_2$ and 0.066 gram $Na_2O$ per cc. A second solution was prepared by dissolving 387 grams of sodium aluminate in water to form 100 liters of solution. These two solutions were mixed in batch fashion with efficient stirring in the ratio of 100 volumes of the former to 19 volumes of the latter. The sodium silicate-sodium aluminate solution was mixed with 4.535 normal sulfuric acid in the ratio of 119.0 volumes of silicate-aluminate solution to 47.35 volumes of sulfuric acid in the nozzle mixer. The resulting sol leaving the mixer was introduced into the top of a column of mineral oil whose depth was eight feet. The globules of solution fell through the oil and gelled before passing into the layer of water located beneath the oil. The gel in the globular form was conducted out of the bottom of the column in a stream of water and on removal from the water, it was washed with an aqueous solution of a wetting agent to remove oil from its surface. It was then washed with water and $NH_4Cl$ solution to replace zeolitically-held sodium ions by ammonium ions which are capable of being driven off as $NH_3$ gas by heating. The gel was dried slowly and uniformly at 180° F. until shrinkage was substantially complete and the drying was continued at gradually increasing temperature up to 1050° F. at which temperature it was maintained for two hours. The silica-alumina gel retained its spheroidal shape during the washing and drying operations.

The time of gelation for the concentration and proportions given above was 15 seconds, while the pH was 5.5. The concentration of silica-alumina is 13 grams per 100 cc. of the mixed solutions.

Example II—Silica alumina gel

This example illustrates the advantage of a mixture of a weak acid and a strong acid in preparing a silica hydrogel containing a minor amount of alumina. The concentration of silica alumina is 15 grams per 100 cc. of the mixed solution in contrast to 13 grams per 100 cc. as shown in Example I.

An acid solution was prepared by mixing 11.10 liters of 9.2 normal sulfuric acid with 2.00 liters of 3.04 normal acetic acid. This acid solution was mixed in the nozzle mixer with the sodium aluminate-sodium silicate solution prepared as described in Example I. The two solutions were mixed in the ratio of 26.20 volumes of the former solution to 119.0 volumes of the latter. The spheroidal hydrogel pellets were processed by the method described in Example I.

The time of gelation for the concentration and proportion of reactants given above was 25 seconds, while the pH was 5.5.

Example III—Silica gel

The sodium silicate solution prepared as described in Example I was mixed in the nozzle mixer with a 4.910 normal solution of sulfuric acid in the ratio of 100 volumes of the former to 66.9 volumes of the latter. The spheroidal hydrogel pellets were processed as above. The time of gelation for the concentration and proportion of reactants was 10 seconds, while the pH was 5.8. The concentration of silica in sol was 13 grams per 100 cc.

Example IV—Silica gel

This example shows the value of employing a mixture of a weak acid and a strong acid in preparing silica hydrogel. The silica concentration in this example is 15 grams per 100 cc. of mixed solutions while that of Example III was 13 grams per 100 cc.

An acid solution was prepared by mixing 10.85 liters of 9.2 normal sulfuric acid with 2.00 liters of 3.04 normal acetic. This acid solution was mixed in the nozzle mixer with the water glass solution prepared as described in Example I in the ratio of 25.70 volumes of the acid solution to 100.0 volumes of the silicate solution. The time of gelation was 10 seconds, while the pH was 5.8.

The spherical pellets of Example I have been compared by hardness tests to pellets formed in the conventional manner. A comparison on cracking efficiency shows the present pellets to have substantially the same effect as molded pellets and broken fragments. A silica-alumina hydrogel was prepared by mixing reagents of the same concentration and in the same proportions as in Example I. This was permitted to gel as a mass in conventional manner.

The hydrogel, after being washed, was divided into two portions, the one part was dried, then crushed to produce fragmentary pieces of the desired size; the other portion of the hydrogel was cast into molds and dried, thus forming small cylindrical pellets. These two forms of gel were subjected to a hardness test developed for cracking catalysts which consists of tumbling an 80 cc. sample of material in a one-pound grease can with one 3/8" x 3¼" Monel metal rod at 80 R. P. M. on a paint roller mill for a period of one hour, then screening the sample to determine the quantity which has powdered and broken down to a size smaller than the original. The fragmentary pieces of gel showed a breakdown of 12%, while the cylindrical pellets were broken down to the extent of 6%. The larger breakdown with the gel in the fragmentary form is probably due to the irregular shapes and to the stresses and fissures developed during the crushing operation.

The spherically-shaped gel of Example I under the above conditions of hardness test gave no powdering nor breakdown. Continuing the test for an additional 15 hours, merely scratched the surface of the spheres, thus producing only a negligible amount of fines. Subjecting the gel to the hardness test for a total of eighty hours gave 0.3% of material which was smaller in size than the original.

The pellets of this invention may act as carriers for other material in the manner well known in the art.

In the following claims reference is made to ions of weak and strong acids in defining the sol from which the gel is obtained. The term "ion" is not limited here to free ions in the sol but includes also combined ions, as the combined acetate ion in unionized acetic acid.

We claim:

1. The process which comprises preparing a sol containing silica capable of setting to a hydrogel without substantial formation of gelatinous precipitate of silica by adding an alkaline silicate solution to an acid solution comprising a major proportion of a strong acid and a minor proportion of a weak acid.

2. The process which comprises preparing a sol containing silica capable of setting to a hydrogel without substantial formation of gelatinous precipitate of silica by adding an alkaline silicate solution containing a soluble metal aluminate to an acid solution comprising a major proportion of a strong acid and a minor proportion of a weak acid.

3. The process which comprises preparing a sol containing silica capable of setting to a hydrogel without substantial formation of gelatinous precipitate of silica by adding an alkaline silicate solution to an acid solution comprising a strong acid and a weak acid.

4. The process which comprises preparing a sol containing silica capable of setting to a hydrogel without substantial formation of gelatinous precipitate of silica by adding an alkaline silicate solution, containing a soluble metal aluminate, to an acid solution comprising a strong acid and a weak acid.

5. The process which comprises preparing a sol containing silica capable of setting to a hydrogel without substantial formation of gelatinous precipitate of silica by adding an alkaline silicate solution to an acid solution comprising a strong acid and a weak acid in a ratio of at least one equivalent of weak acid to 36 equivalents of strong acid.

6. The process which comprises preparing a sol containing silica capable of setting to a hydrogel without substantial formation of gelatinous precipitate of silica by adding an alkaline silicate solution, containing a soluble metal aluminate, to an acid solution comprising a strong acid and a weak acid in a ratio of at least one equivalent of weak acid to 36 equivalents of strong acid.

7. The process which comprises preparing a sol containing silica capable of setting to a hydrogel without substantial formation of gelatinous precipitate of silica by adding an alkaline silicate solution to an acid solution comprising a strong acid and a weak acid in a ratio of about one to two equivalents of weak acid to about 36 equivalents of strong acid.

8. The process which comprises preparing a sol containing silica capable of setting to a hydrogel without substantial formation of gelatinous precipitate of silica by adding an alkaline silicate solution, containing a soluble metal aluminate, to an acid solution comprising a strong acid and a weak acid in a ratio of about one to two equivalents of weak acid to about 36 equivalents of strong acid.

9. The process which comprises preparing a sol containing silica capable of setting to a hydrogel without substantial formation of gelatinous precipitate of silica by adding an alkaline silicate solution to an acid solution comprising a strong acid and a weak acid in a ratio of about one equivalent of weak acid to 18 equivalents of strong acid.

10. The process which comprises preparing a sol containing silica capable of setting to a hydrogel without substantial formation of gelatinous precipitate of silica by adding an alkaline silicate solution, containing a soluble metal aluminate, to an acid solution comprising a strong acid and a weak acid in a ratio of about one equivalent of weak acid to 18 equivalents of strong acid.

11. The process which comprises preparing a sol containing silica capable of setting to a hydrogel without substantial formation of gelatinous precipitate of silica by adding an alkaline silicate solution to an acid solution comprising a strong acid and a weak acid in a ratio of at least one equivalent of weak acid to 36 equivalents of strong acid to give a sol having a pH of about 5 to 8.

12. The process which comprises preparing a sol containing silica capable of setting to a hydrogel without substantial formation of gelatinous precipitate of silica by adding an alkaline silicate solution, containing a soluble metal aluminate, to an acid solution comprising a strong acid and a weak acid in a ratio of at least one equivalent of weak acid to 36 equivalents of strong acid to give a sol having a pH of about 5 to 8.

13. The process which comprises preparing a sol containing silica capable of setting to a hydrogel without substantial formation of gelatinous precipitate of silica by adding an alkaline silicate solution to an acid solution comprising a strong acid and a weak acid in a ratio of about one equivalent of weak acid to 18 equivalents of strong acid to give a sol having a pH of about 5 to 8.

14. The process which comprises preparing a sol containing silica capable of setting to a hydrogel without substantial formation of gelatinous precipitate of silica by adding an alkaline silicate solution, containing a soluble metal aluminate, to an acid solution comprising a strong acid and a weak acid in a ratio of about one equivalent of weak acid to 18 equivalents of strong acid to give a sol having a pH of about 5 to 8.

MILTON M. MARISIC.
SHELDON DRAY.

CERTIFICATE OF CORRECTION.

Patent No. 2,386,810.  October 16, 1945.

MILTON M. MARISIC, ET AL.

It is hereby certified that error appears in the printed specification of the above numbered patent requiring correction as follows: Page 3, first column, line 44, for "gelatin" read --gelation--; and second column, line 13, for "100" read --10--; and that the said Letters Patent should be read with this correction therein that the same may conform to the record of the case in the Patent Office.

Signed and sealed this 9th day of April, A. D. 1946.

Leslie Frazer (Seal)  First Assistant Commissioner of Patents.